United States Patent
Cartlidge et al.

(10) Patent No.: US 9,584,387 B1
(45) Date of Patent: Feb. 28, 2017

(54) SYSTEMS AND METHODS OF SENDING A PACKET IN A PACKET-SWITCHED NETWORK THROUGH A PRE-DETERMINED PATH TO MONITOR NETWORK HEALTH

(71) Applicant: Google Inc., Mountain View, CA (US)

(72) Inventors: Ross Cartlidge, Rose Bay (AU); Nicolas Guilbaud, Bondi (AU); Libin Huang, Rhodes (AU); Arya Reais-Parsi, Ashfield (AU)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 13/913,762

(22) Filed: Jun. 10, 2013

Related U.S. Application Data (60) Provisional application No. 61/791,061, filed on Mar. 15, 2013.

(51) Int. Cl.
G06F 15/173 (2006.01)
H04L 12/26 (2006.01)

(52) U.S. Cl.
CPC ............................. H04L 43/0876 (2013.01)

(58) Field of Classification Search
None
See application file for complete search history.

(56) References Cited

U.S. PATENT DOCUMENTS

| | | | |
|---|---|---|---|
| 7,283,563 B1 * | 10/2007 | Allan | H04L 12/2602 370/469 |
| 7,899,048 B1 * | 3/2011 | Walker | H04L 12/4641 370/390 |
| 8,160,056 B2 | 4/2012 | Van Der Merwe et al. | |
| 8,289,845 B1 * | 10/2012 | Baldonado | H04L 43/16 370/229 |
| 2006/0018255 A1 | 1/2006 | Tankhiwale | |
| 2007/0217419 A1 * | 9/2007 | Vasseur | H04L 12/66 370/392 |
| 2010/0309795 A1 * | 12/2010 | Shah | H04L 45/00 370/252 |
| 2011/0125921 A1 * | 5/2011 | Karenos | H04L 45/00 709/240 |
| 2011/0267954 A1 * | 11/2011 | Seetharaman | H04L 43/026 370/241 |
| 2012/0057466 A1 * | 3/2012 | Allan | H04L 45/125 370/238 |
| 2012/0230214 A1 | 9/2012 | Kozisek et al. | |
| 2012/0269073 A1 * | 10/2012 | Xu | H04L 12/2697 370/242 |
| 2012/0307629 A1 | 12/2012 | Vasseur et al. | |

* cited by examiner

*Primary Examiner* — Scott B Christensen
(74) *Attorney, Agent, or Firm* — McDermott Will & Emery LLP (57) ABSTRACT

Systems and methods for monitoring a computer network are provided. A network monitoring system generates a plurality of monitoring packets. The plurality of generated monitoring packets travel along respective paths through the computer network across a plurality of monitored links to respective destination nodes. Every monitored link in the computer network is included in at least one path. Each monitoring packet includes forwarding information which identifies each of the monitored links the monitoring packet is to traverse along its respective path. The network monitoring system tracks receipt of the generated monitoring packets by the respective destination nodes to detect faulty links.

20 Claims, 8 Drawing Sheets

Path 305A (ABCFI)
Path 305B (ABEFI)
Path 305C (ADEFI)
Path 305D (ADEHI)
Path 305E (ADGHI)

SYSTEMS AND METHODS OF SENDING A PACKET IN A PACKET-SWITCHED NETWORK THROUGH A PRE-DETERMINED PATH TO MONITOR NETWORK HEALTH

CROSS-REFERENCE TO RELATED PATENT APPLICATIONS

This application claims priority, under 35 U.S.C. §119(e), to U.S. Provisional Patent Application No. 61/791,061, filed Mar. 15, 2013, and entitled "Systems And Methods Of Sending A Packet In A Packet-Switched Network Through A Pre-Determined Path To Monitor Network Health," the disclosure of which is hereby incorporated by reference.

BACKGROUND

The present disclosure relates generally to monitoring computer networks, and, more particularly, to detecting faulty links in a computer network.

Computer networks may include any number of routers and other devices that direct the transmission of data from one location to another. For example, a source (e.g., a computer, a smart phone, a server, a data center, a router, etc.) may transmit data using any number of different paths in a computer network to reach a destination (e.g., another computer, smart phone, data center, router, etc.). Each path is typically composed of multiple links between intermediate nodes in the network. Complete and partial failures of network links can result in congested, and in some cases, failed communications. In large networks, identifying faulty links can be quite challenging.

SUMMARY

These implementations are mentioned not to limit or define the scope of the disclosure, but to provide examples of implementations of the disclosure to aid in understanding thereof.

At least one aspect of the disclosure is directed to a computer-implemented method of monitoring a computer network including a plurality of monitored links. The method includes generating, by a network monitoring system, a plurality of monitoring packets. The plurality of generated monitoring packets travel along respective paths through the computer network across the plurality of monitored links to respective destination nodes. Every monitored link in the computer network is included in at least one path. Each monitoring packet includes forwarding information which identifies each of the monitored links the monitoring packet is to traverse along its respective path. The method includes tracking receipt of the generated packets by the respective destination nodes.

Another aspect of the disclosure is directed to a system of monitoring a computer network including a plurality of monitored links. The system includes a network monitoring system configured to generate a plurality of monitoring packets that can travel along respective paths through the computer network across the plurality of monitored links to respective destination nodes. Every monitored link in the computer network is included in at least one path. Each monitoring packet includes forwarding information which identifies each of the monitored links the monitoring packet is to traverse along its respective path. The network monitoring system tracks receipt of the generated packets by the respective destination nodes.

A further aspect of the disclosure is directed to a computer readable storage medium storing instructions that when executed by one or more data processors, cause the one or more data processors to perform operations. The operations include generating a plurality of monitoring packets that travel along respective paths through the computer network across the plurality of monitored links to respective destination nodes. Every monitored link in the computer network is included in at least one path. Each monitoring packet includes forwarding information which identifies each of the monitored links the monitoring packet is to traverse along its respective path. The operations include tracking receipt of the generated packets by the respective destination nodes.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of monitoring a computer network including a plurality of monitored links. The various concepts introduced above and discussed in greater detail below may be implemented in any of numerous ways, as the described concepts are not limited to any particular manner of implementation. Examples of specific implementations and applications are provided primarily for illustrative purposes.

The present disclosure is directed generally to systems and methods of sending packets in a computer network through pre-determined paths to monitor the health of the network. For example, a network monitoring system can determine a set of paths to send a set of network monitoring packets through the network such that all the links in the network which are being monitored can be traversed. In some implementations, in order for the packets to travel the paths, the network monitoring system creates monitoring packets that include forwarding information identifying each link in the path that the packet should traverse. In some implementations, the forwarding information can be generated such that a node in the network can forward the monitoring packets to the next node without performing any or performing only minimal routing table or Internet Protocol (IP) lookup operations. The systems and methods described herein also track receipt by the destination nodes in the paths such that faulty links can be identified.

Figure 1:
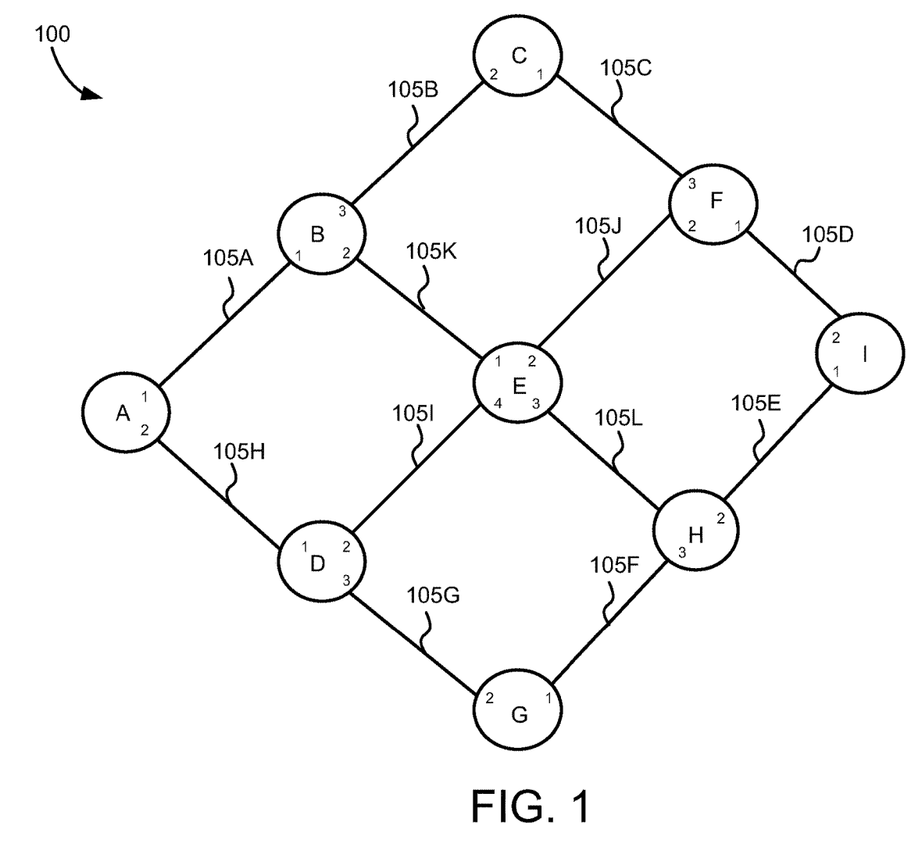
FIG. 1 is a schematic diagram of an example computer network, according to an illustrative implementation.

FIG. 1 is a schematic diagram of an example computer network 100. The network 100 can be any type of computer network that can be monitored, for example, by transmitting packets between nodes or other components of the network. For instance, the network 100 can include local area network (LAN), wide area network (WAN), metropolitan area network (MAN), mobile network, ad hoc network, data center, etc. Referring to FIG. 1, the computer network 100 includes a plurality of nodes A-I and a plurality of network links 105A-105L. The nodes A-I may include routers or switches. Each of the nodes A-I has a plurality of interfaces. For example, the node B can have three interfaces 1, 2, and 3. A node can have interfaces configured for different physical types of network connections, such as copper cables, fiber optic, or wireless transmission. Multiple interfaces on a node can also be configured for the same type of connection.

The network links 105A-105L carry packets between the nodes A-I. For example, the node A may transmit packets to the node B via the network link 105A. The network links 105A-105L may be any type of hardwired and/or wireless data connection, or any combination thereof. For example, the network link 105A may be a hardwired fiber optic line or a wireless connection that conveys data from node A to node B. The network links 105A to 105L may be bidirectional or unidirectional. For example, the network link 105A may be a bidirectional link that allows node A to convey data to node B and vice versa. While the example network 100 has 9 nodes, fewer, additional, and/or different nodes may be included in the network in various implementations. For example, an illustrative monitored network may include tens, hundreds, thousands, or even larger numbers of nodes.

In a computer network, any link, or other components of the network, can fail. For example, fiber cuts, defective interfaces or line cards, memory corruptions, software malfunctions, etc. can cause data loss or other problems to the network. When such events occur, even if packets can be rerouted, traffic can become congested, delaying packet delivery. Sometimes such failures can be difficult to isolate, especially in large scale networks. Accordingly, a network monitoring system can be implemented to monitor the network to identify such faults. One example of such a network monitoring system is shown in FIG. 2.

Figure 2:
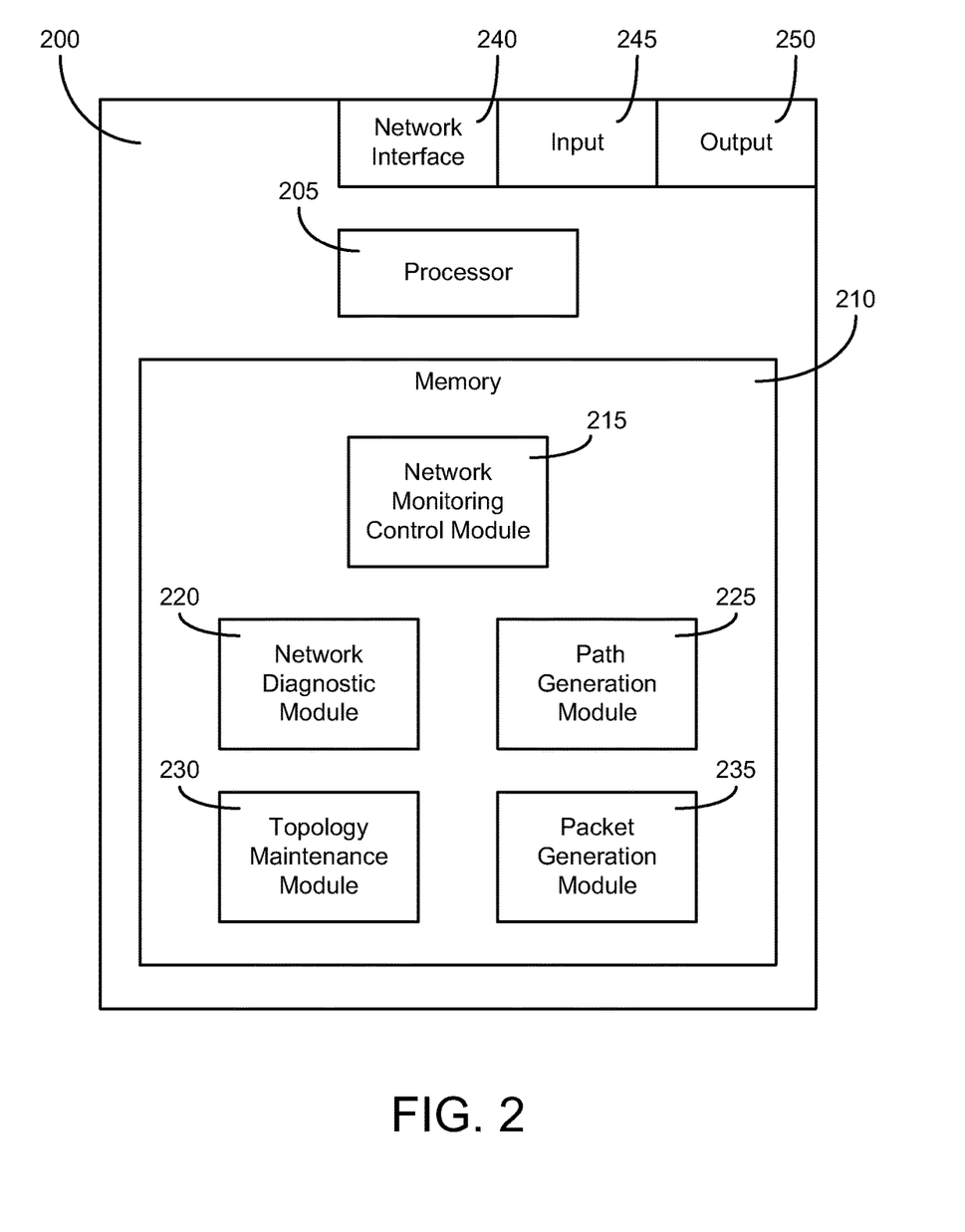
FIG. 2 is a block diagram of a network monitoring system, according to an illustrative implementation.

FIG. 2 is a block diagram of an example network monitoring system 200. In brief overview, the network monitoring system 200 can monitor network links and detect faults. In some implementations, the network monitoring system 200 can be implemented on one or more nodes of the network 100. The network monitoring system 200 includes at least a processor 205, a memory 210, a network interface 240, an input device 245, and an output device 250. Together, these components of the network monitoring system 200 interoperate to generate network monitoring packets, generate paths for the packets to travel, send the packets into the network, maintain topology of the network, track receipt of the packets at the destination, and identify faults of the network based on the tracking of the receipt.

The processor 205 may be or include one or more microprocessors, an application specific integrated circuit (ASIC), a circuit containing one or more processing components, a group of distributed processing components, circuitry for supporting a microprocessor, or other hardware configured for processing. The processor 205 is also configured to execute computer code stored in the memory 210 to complete and facilitate the activities described herein.

The memory 210 can be any volatile or non-volatile computer-readable medium capable of storing data and/or computer code relating to the activities described herein. For example, the memory 210 is shown to include a network monitoring control module 215, a network diagnostic module 220, a path generation module 225, a topology maintenance module 230, and a packet generation module 235. In general, a module is a logical collection of computer executable instructions which can be called upon to carry out a particular function. Referring to FIG. 2, when executed by the processor 205, the network monitoring control module 215, the network diagnostic module 220, the path generation module 225, the topology maintenance module 230, and the packet generation module 235 cause the network monitoring system 200 to perform the functions as described further herein. In some implementations, one or more of these modules can be implemented in firmware or hardware. In some implementations, the modules 215-235 can be implemented in one system, such as the network monitoring system 200. In other implementations, each of the modules 215-235 can be implemented in different and separate systems and/or executed by different and separate processors, or a combination thereof.

In some implementations, the network monitoring control module 215 is configured as a high level control module which performs functions, such as calling other modules in the network monitoring system 200, sending out the monitoring packets to the network 100, generating user interfaces, etc. For example, in one implementation, the network monitoring control module 215 can generate an user interface which allows user interactions with the network monitoring system 200. The user interface can be a graphical user interface, a web-based user interface, a command line user interface, or other types of user interfaces. In one implementation, the user interface allows users (e.g., network administrators) to monitor the frequency of the packet transmission, accepts user inputs to modify parameters of the network monitoring system 200, view alerts indicating detected faults, and/or display other monitoring results.

In one implementation, the network diagnostic module 220 is configured to detect faulty links in the network 100. For example, after the network monitoring control module 215 sends the monitoring packets into the network 100, the packets traverse the network links 105A-105L of the network 100 along different paths. Each of the network links 105A-105L being monitored is included in at least one path. The network diagnostic module 220 is configured to detect which monitoring packets failed to successfully reach their respective destinations. By processing data indicative of which packets successfully reached their destinations and which did not, the network diagnostic module 220 can detect faulty links in the network. Examples of how the network diagnostic module 220 detects faulty links is described further herein in relation to FIGS. 3 and 4A.

In one implementation, in order to detect faulty links, the network monitoring system 200 generates paths that the monitoring packets traverse through the network 100. The path generation module 225 is configured to generate these paths. In one implementation, the monitoring path generation module 225 queries the topology maintenance module 230 to obtain the topology of the network 100 in order to generate paths.

The topology maintenance module 230 keeps track the topology of the network 100. Network topology is the arrangement of various elements (e.g., nodes, links, etc.) in the network. In some implementations, the topology maintenance module 230 receives topology information transmitted by other nodes in the network 105, for example, using link state messages or other topology dissemination messages. Based on the topology information, the topology maintenance module 230 builds and updates the topology of the network 100. The topology maintenance module 230 maintains a snapshot of the network 100 at any given time, which indicates, for example, where the nodes A-I are, how they are connected, and through which interfaces they are connected. The topology of the network 100 can be stored in a data storage unit of the network monitoring system 200 or a data storage unit outside of the network monitoring system 200. In some implementations, based on the topology of the network 100, the path generation module 225 generates a set of paths in the network 100 that monitoring packets traverse. An example of how the monitoring path generation module 225 generates the paths is described further herein in FIG. 6.

Referring back to FIG. 2, the packet generation module 235 is configured to generate monitoring packets. The generated monitoring packets are configured to travel along the respective paths generated by the path generation module 225. In some implementations, in order for the monitoring packets to traverse the respective paths, each of the monitoring packets is generated to include forwarding information. The forwarding information can identify all of the links that the monitoring packet is to travel to get to the destination. For example, the forwarding information can be incorporated into the monitoring packets using a set of Multiprotocol Label Switching (MPLS) stacked static labels or a set of nested Generic Routing Encapsulation (GRE) headers or methods appropriate for other transmission protocols. Examples of how such forwarding information can be incorporated into the monitoring packets are discussed further herein in relation to FIGS. 4B and 4C.

The network interface 240 allows the network monitoring system 200 to communicate with other nodes in the network 100 by transmitting and receiving packets. For example, the network interface 240 can include one or more network interface cards, which provide hardware interfaces between the network monitoring system 200 and the network 100. The network interface cards can provide wired connections or wireless connections. For example, a network interface card can implement the electronic circuitry required to communicate using a specific physical layer and data link layer standard such as Ethernet, fiber distributed data interface (FDDI), Wi-Fi, Frame Relay, Asynchronous Transfer Mode (ATM), Point-to-Point Protocol (PPP) or Token Ring, thereby providing a base for a full network protocol stack, allowing communications from among small groups of computers on the same LAN to large-scale network communications through routable protocols, such as IP.

The network monitoring system 200 also includes an input device 245 and an output device 250. For example, the input device 245 (e.g., a pointing device, a keyboard, a touchscreen, or another form of input device) can allow users (e.g., network administrators) to input information. The output device 250 (e.g., one or more display units) allows various information to be viewed or otherwise perceived in connection with execution of the instructions. For example, the output device 250 allows an alert to be displayed when the network diagnostic module 220 detects faulty links. The network monitoring system 200 can also include other components such as a bus, a storage device, etc.

Figure 3:
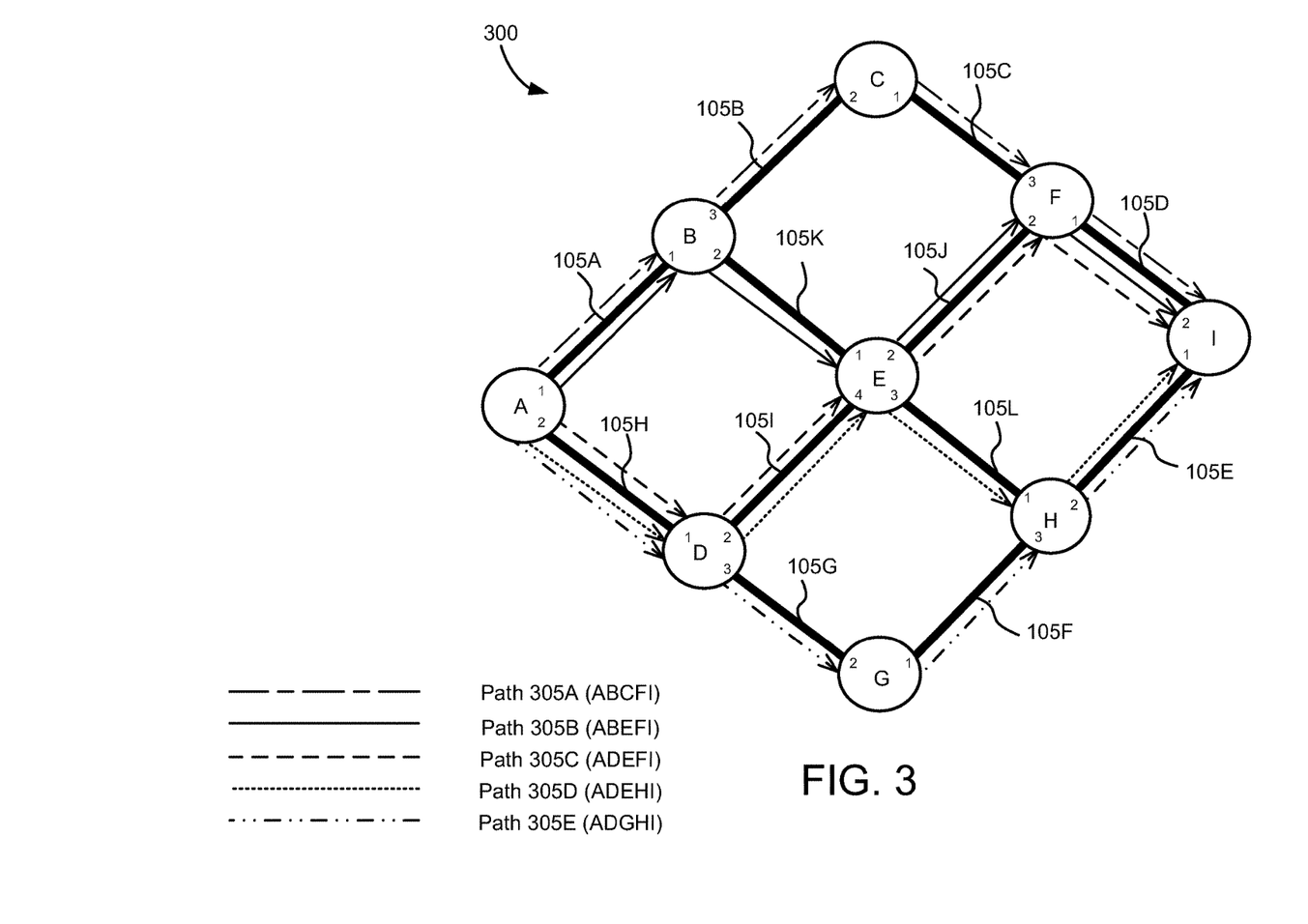
FIG. 3 is a schematic diagram of an example monitored network, according to an illustrative implementation.

FIG. 3 is a schematic diagram of an example monitored network 300. The monitored network 300 is the same network 100 shown in FIG. 1 with the addition of a set of example paths 305A-305E generated by the path generation module 225 of the network monitoring system 200. Referring to FIG. 3, each of the paths 305A-305E starts with a source node (e.g., node A) and ends at a destination node (e.g., node I). Other nodes (e.g., nodes B-H) in the monitored network 300 are referred to as intermediate nodes. In one implementation, the source node A can include or be included in the network monitoring system 200. In another implementation, the source node A and the network monitoring system 200 can be two independent computing entities. In this implementation, the network monitoring system 200 sends the monitoring packets to the source node A which in turn sends the monitoring packets to the intermediate nodes B-H along the respective paths 305A-305E.

In some implementations, each node in the network 300 may have software installed on it for handling monitoring packets. This software code, when executed by a processor at the node, causes the node to look for and identify a particular flag set in each monitoring packet indicating the packet should be treated by the node as described herein. This treatment is described further below in relation to FIGS. 4B and 4C.

In some implementations, each of the network links (or monitored links) 105A-105L is included in at least one of the paths 305A-305E. By way of example, the monitored link 105A is included in both the paths 305A and 305B, the monitored link 105H is included in paths 305C, 305D, and 305E, while the monitored link 105B is only included in one path 305A. While the example monitored network 300 shows 5 paths, fewer, additional, and/or different paths may be included in the network depending on the number of nodes and links included in the network.

In some implementations, the network monitoring system 200 can detect faulty links by tracking receipts of the generated monitoring packets by the respective destination nodes. By generating a set of suitable paths that cover all the monitored links, the network monitoring system 200 detects the faulty links. For example, referring to FIG. 3, if the monitoring packets are successfully received at the destination node I via paths 305A and 305C, but not the path 305B, the network monitoring system 200 can determine that the monitored link 105K is a faulty link. To further explain, as shown in FIG. 3, the path 305A includes the monitored links 105A, 105B, 105C, and 105D, the path 305B includes the monitored links 105A, 105K, 105J, and 105D, the path 305C includes the monitored links 105H, 105I, 105J, and 105D. Because the monitoring packets are successfully received at destination via the paths 305A and 305C, the monitored links 105A, 105B, 105C, 105D, 105H, 105I, 105J can be determined to be operational. The only monitored link in the path 305B that does not overlap with the links in the paths 305A and 305C is 105K, which therefore is the faulty link. In another example, if the destination node I does not successfully receive the monitoring packets via the path 305D, but successfully receives the packet via the paths 305C and 305E, the monitoring system 200 can identify that the monitored link 105L is a faulty link. Similarly, the only monitored link in the path 305D that does not overlap with the links in the paths 305C and 305E is the link 105L. As such, the network diagnostic module 220 determines that the link 105L is a faulty link.

Figure 4A:
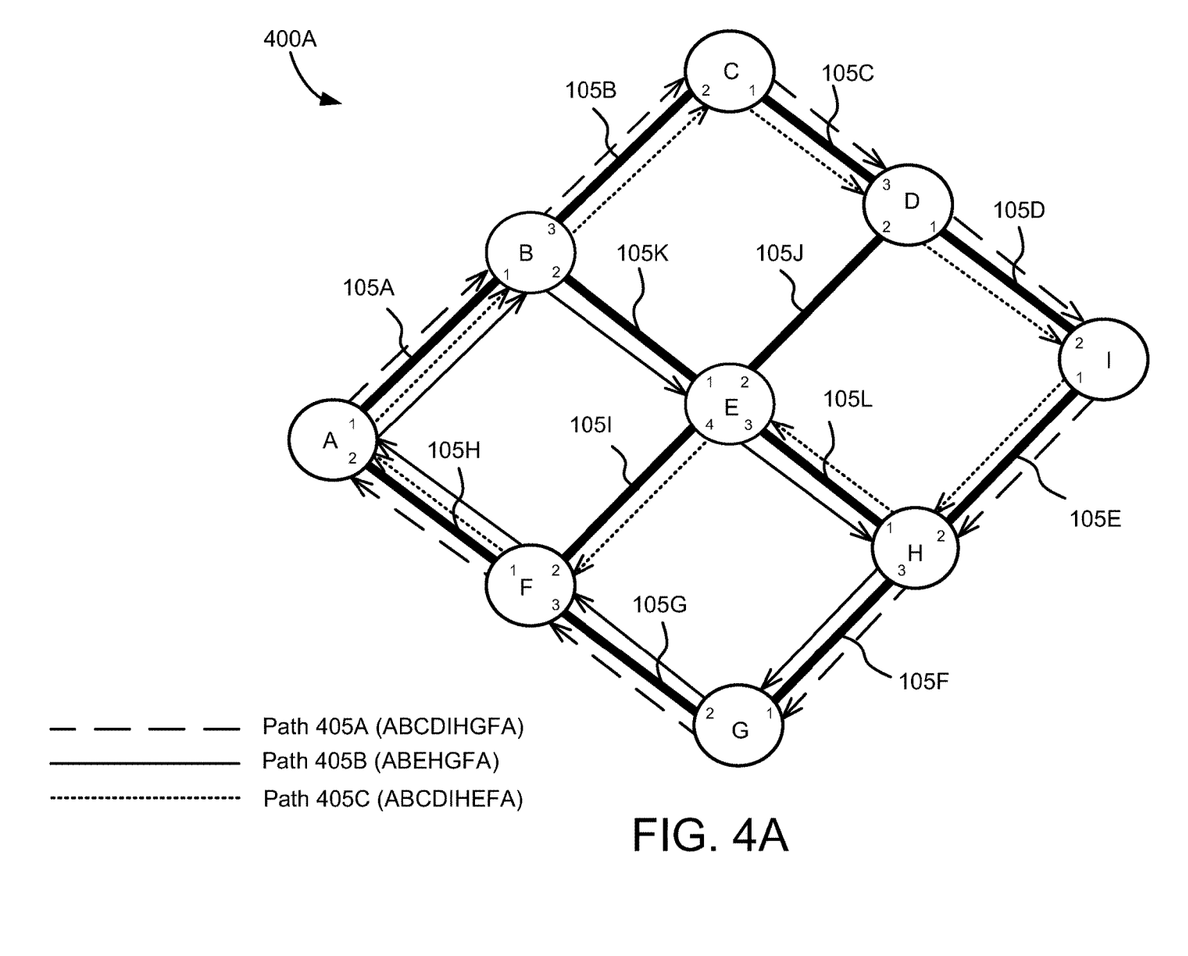
FIG. 4A is a schematic diagram of another example monitored network, according to an illustrative implementation.

FIG. 4A is a schematic diagram of another example monitored network 400A. Similar to the monitored network 300 in FIG. 3, the monitored network 400A is the same network 100 shown in FIG. 1 with the addition of a set of example paths 405A-405C generated by the path generation module 225 of the network monitoring system 200. Different from the monitored network 300 in FIG. 3, in the monitored network 400A, the node A is both the source node and the destination node. By allowing the monitoring packets to loop back to the source node, the network monitoring system 200 can keep track of the receipts of the generated monitoring packets more easily. For example, if the node A is the network monitoring system 200, the network monitoring system 200 performs both the function of sending the monitoring packets into the network and the function of receiving the monitoring packets. Thus, the monitoring process is more effective and has less overhead.

Referring to FIG. 4A, if the monitoring packets are received at the destination node A via paths 405A and 405C, but not the path 405B, the network monitoring system 200 can determine that the monitored link 105K is a faulty link. As shown in FIG. 4A, the only monitored link in the path 405B that does not overlap with the links in the paths 405A and 405C is the link 105K. Accordingly, the network diagnostic module 220 determines that the link 105K is a faulty link. While the example monitored network 400A shows 3 paths, fewer, additional, and/or different paths may be included in the network depending on the number of nodes and links included in the network.

Figure 4B:
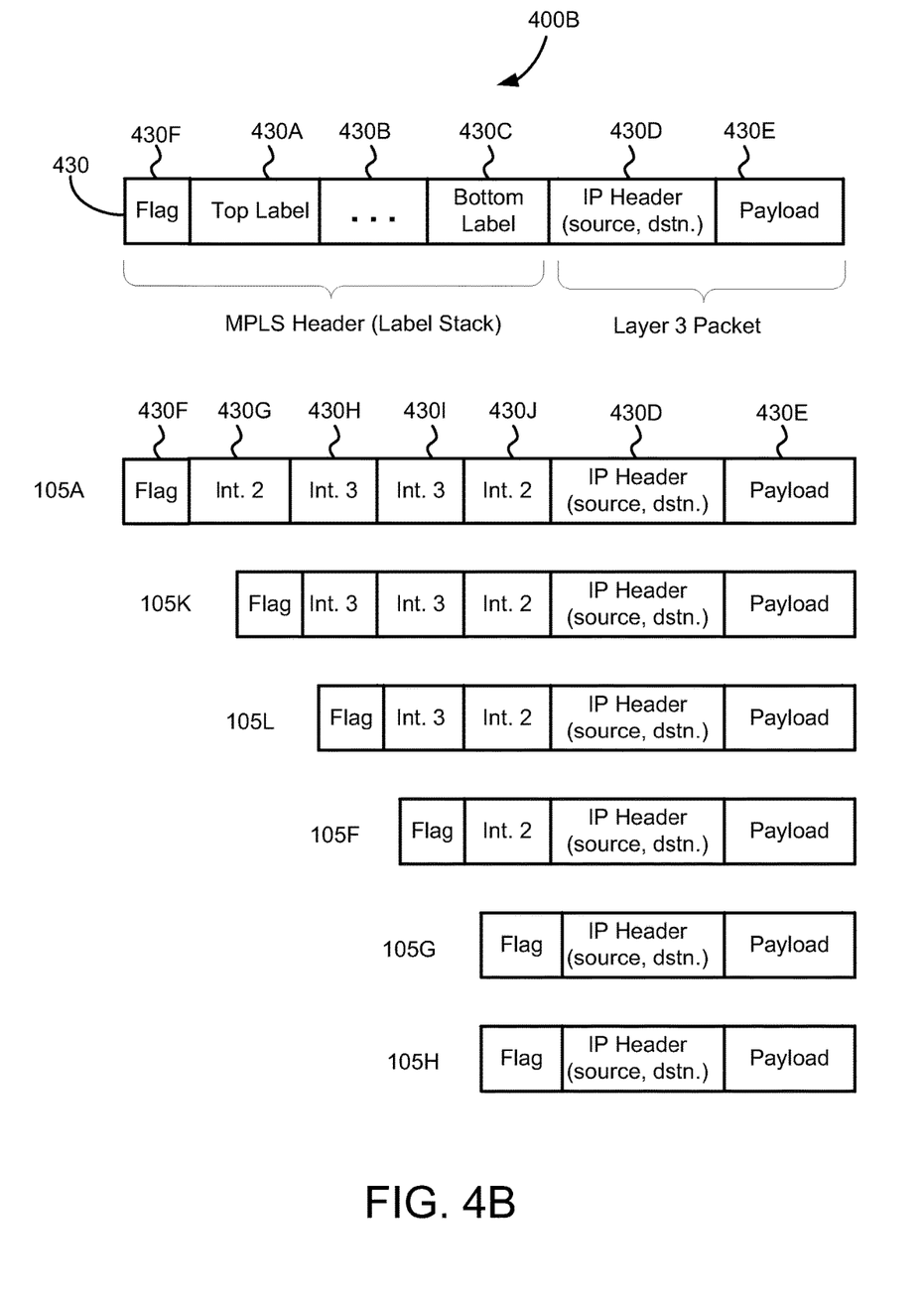
FIG. 4B is a flow diagram of an example monitoring packet with a MPLS header traveling along one example path of the monitored network, according to an illustrative implementation.

FIG. 4B is a flow diagram of an example monitoring packet 430 with a MPLS header traveling along one example path of the monitored network 400A. In one implementation, the packet generation module 235 of the network monitoring system 200 generates monitoring packets such as the example monitoring packet 430. As described previously with reference to FIG. 2, each of the monitoring packets is generated with forwarding information which can identify all of the links that the monitoring packet is to travel to reach the destination. Different network protocols can be utilized to generate the monitoring packets. One such protocol is the Multiprotocol Label Switching (MPLS) protocol. Other protocols include, for example, the Generic Routing Encapsulation (GRE) protocol and the IP-in-IP encapsulation (IPIP) protocol. An example of the monitoring packet using the GRE header is described further herein in FIG. 4C.

The MPLS protocol is a mechanism in computer networks that directs data from one network node to the next based on short path labels rather than long network addresses, avoiding complex lookups in a routing table. The labels identify links between adjacent nodes rather than endpoints. MPLS can encapsulate packets of various network protocols. MPLS supports a range of access technologies, including T1/E1, ATM, Frame Relay, and DSL.

Referring to FIG. 4B, an example monitoring packet 430 is shown. The monitoring packet 430 has a MPLS header which includes a stack of MPLS static labels 430A-430C. The stack of MPLS labels 430A-430C includes the forwarding information that identifies the path along which the monitoring packet 430 traverses to get to its destination. In the example, the stack of MPLS labels 430A-430C includes a top label 430A, a plurality of intermediate labels 430B, and a bottom label 430C. According to the MPLS protocol, each label in the label stack is 4 bytes long, consisting of a 20-bit Label field holding the label value, a 3-bit Exp/Qos indicating the class of service, a 1-bit S field identifying the bottom of the stack, and a 8-bit TTL field indicating how many more times the packet may be forwarded. The packet 430 also includes a multi-bit flag 430F, which can instruct the nodes to treat the packet as described herein. The MPLS protocol sometimes is described as a layer 2.5 protocol because the MPLS header is positioned between a layer 2 header and a layer 3 header in the packet. As illustrated in FIG. 4B, a layer 3 packet follows the MPLS header. In this example, an IP packet which includes an IP header 430D and an IP payload 430E follows the MPLS header. The IP header 430D, among other fields, includes a source address and a destination address of the monitoring packet 430.

Referring to FIG. 4B, the monitoring packet 430 travels along the path 405B in FIG. 4A. In brief overview, the monitoring packet 430 traverses the path 405B which includes: source node A→link 105A→node B→link 105K→node E→link 105L→node H→link 105F→node G→link 105G→node F→link 105 H→destination node A.

In further detail, the source node A sends the monitoring packet 430 into the network via the link 105A. The packet 430 traveling on the link 105A has 4 labels 430G (Int. 2), 430H (Int. 3), 430I (Int. 3), 430J (Int. 2). In one implementation, each of the labels is configured to identify the transmission interface of a receiving node through which the packet is to be sent to the next node. In this example, the respective interfaces are Int. 2, Int. 3, Int. 3, Int. 2. Continuing with the example, when node B receives the packet 430 with the MPLS header containing the stack of labels 430G (Int. 2), 430H (Int. 3), 430I (Int. 3), 430J (Int. 2), node B checks the flag 430F. If the flag 430F is set, the node pops (removes) the top label 430G (Int. 2) and forwards the packet along link 105K via interface 2 towards node E. While in this implementation, the nodes pop the top label each time when receiving the packet, in other implementations, the nodes pop the bottom label.

Referring back to FIG. 4B, the monitoring packet 430 traveling on the link 105K now has 3 labels 430H (Int. 3), 430I (Int. 3), 430J (Int. 2). When node E receives the packet 430, node E checks the flag and pops the top label 430H (Int. 3) and forwards the packet to node H via interface 3. On link 105L, the packet 430 now has 2 labels 430I (Int. 3), 430J (Int. 2). When node H receives the packet 430, node H pops the top label 430I (Int. 3), and forwards the packet to node G via interface 3. The packet 430 traveling on the link 105F now has 1 label 430J (Int. 2). When node G receives the packet 430, node G checks the flag and pops the only label left, which is the bottom label 430J (Int. 2). Node G forwards the packet 430 to node F via interface 2. On the link 105G, the packet 430 has no labels. When the node F receives the packet 430, node F identifies it as a normal IP packet and forwards the packet to the destination node A based on the destination address in the IP header. In some other implementations, the last label in the MPLS header indicates the interface used by the next-to-last node in the path to transmit the packet to the destination node. When the destination node receives the packet without any labels, it processes the IP packet, determines that it is the recipient of the packet, and passes it up its protocol stack for further processing.

Figure 4C:
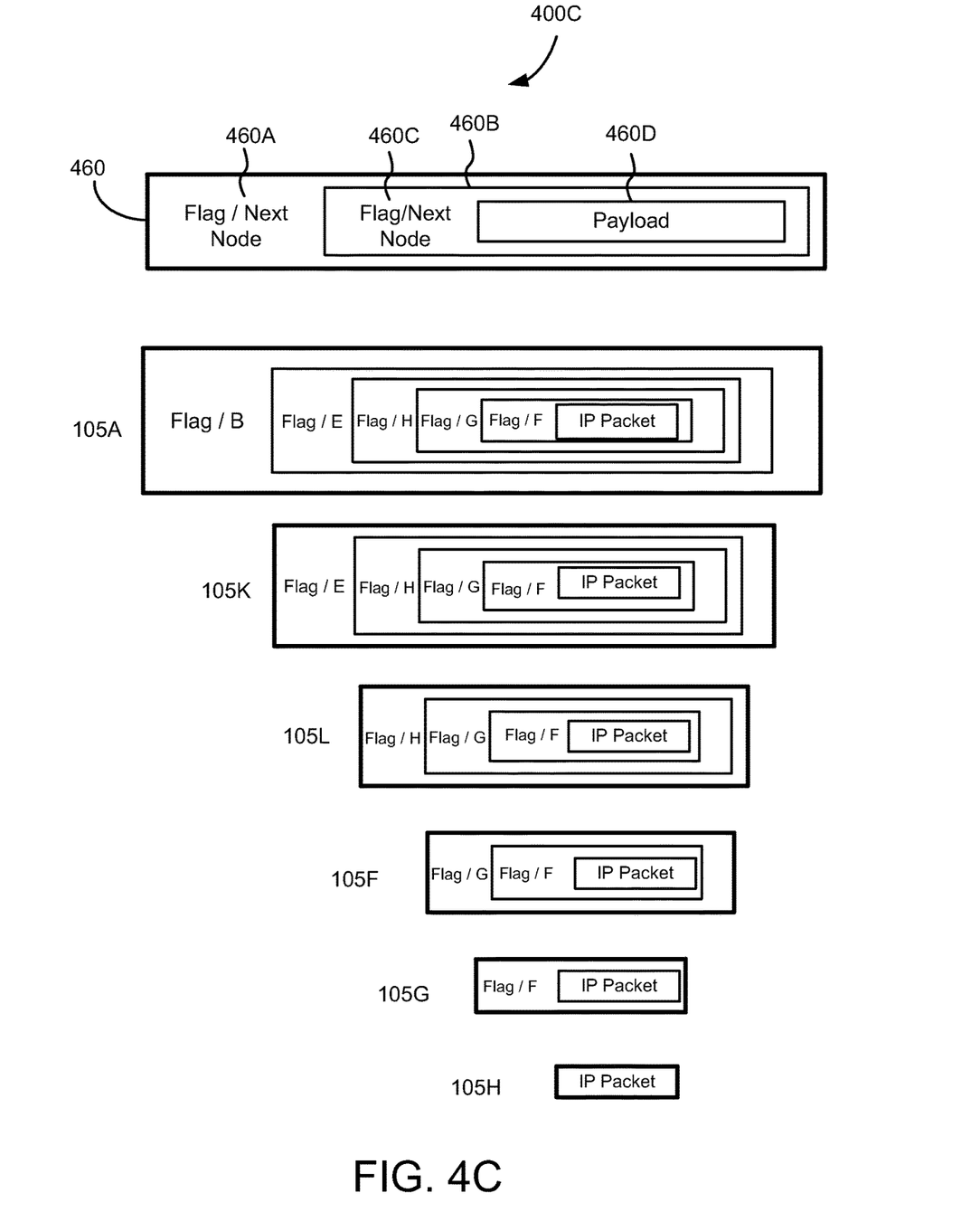
FIG. 4C is a flow diagram of an example monitoring packet with a set of nested GRE headers traveling along one example path of the monitored network, according to an illustrative implementation.

FIG. 4C is a flow diagram of an example monitoring packet 460 with a set of nested GRE headers traveling along one example path of the monitored network 400A. The Generic Routing Encapsulation protocol is a tunneling protocol which can encapsulate a wide variety of network layer protocols inside virtual point-to-point links over an Internet Protocol internetwork. For example, GRE is frequently used to route packets within data centers. For the purpose of illustration, in a simplified fashion, the packet 460 includes a GRE header 460A and a payload 460B. The GRE header 460A, among other fields, includes a flag and an address of the next node that packet is forwarded to. The payload 460B includes (and thereby encapsulates) another GRE header 460C with a corresponding payload 460D. In a similar manner, the payload 460D can encapsulate another GRE header with its payload, which in turn can encapsulate another GRE header and its payload, and so on.

Referring to FIG. 4C, the source node A sends the monitoring packet 460 into the network via the link 105A. The packet 460 traveling on the link 105A has 5 nested GRE headers, each holding a flag and the addresses of node B, node E, node H, node G, and node F, respectively. Those addresses in the nested GRE headers identify the path that the packet 460 is to traverse. In some implementations, the receiving node performs cross-references a look up table to identify the proper interface to use to forward the packet to the next node in the path. Particularly in data center applications, this look up table can be separate and distinct from the node's routing table. Accordingly, the cross reference can be carried out with minimal overhead. Continuing with the example, when node B receives the packet 460, node B checks the flag in the header. If the flag is set, node B removes the outermost header, which contains the address of node B, and forwards the packet to node E based on the address of node E in the new outermost header.

Continuing with the example, the monitoring packet 460 traveling on the link 105K now has 4 nested GRE headers. When node E receives the packet 460, node E checks the flag and removes the outermost header, which contains the address of node E, and forwards the packet to node H based on the address of node H in the new outermost header. On the link 105L, the packet 460 now has 3 nested GRE headers, containing the addresses of node H, node G, and node F. When node H receives the packet 460, node H checks the flag and removes the outermost header, which contains the address of node H, and forwards the packet to node G based on the address of node G in the new outermost header. The packet 460 traveling on the link 105F now has 2 nested headers, containing the addresses of node G and node F. When node G receives the packet 460, node G checks the flag and removes the outermost header, which contains the address of node G, and forwards the packet to node F based on the address of node F in the new outermost header. The packet 460 traveling on the link 105G now has only one GRE header which contains the address of node F. When node F receives the packet 460, node F removes the only remaining GRE header and forwards the packet included in the payload of the packet to the destination node A based on the destination address in the IP header. In some other implementations, the nested GRE headers direct the packet all the way to its destination node, with the last header only being removed at the destination.

Figure 5:
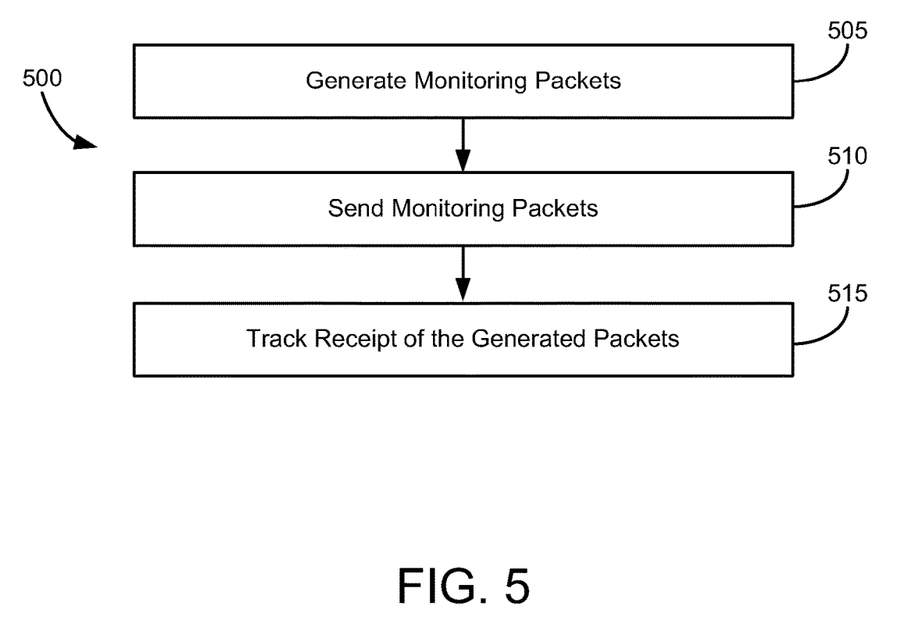
FIG. 5 is a flow diagram of an example method of monitoring a computer network, according to an illustrative implementation.

FIG. 5 is a flow diagram of an example method 500 of monitoring a computer network. In some implementations, the method 500 generates a plurality of monitoring packets (stage 505). For example, the packet generation module 235 of the network monitoring system 200 can be configured to generate a plurality of monitoring packets. The plurality of generated monitoring packets travel along respective paths through the computer network across a plurality of monitored links to respective destination nodes. Every monitored link in the computer network is included in at least one path. Each monitoring packet includes forwarding information which identifies each of the monitored links that the monitoring packet is to traverse along its respective path.

In some implementations, the method 500 sends the generated monitoring packets into the network (stage 510). For example, the network monitoring control module 215 of the network monitoring system 200 sends the monitoring packets into the network.

In some implementations, the method 500 tracks receipt of the generated monitoring packets by the respective destination nodes (stage 515). For example, the network diagnostic module 220 of the network monitoring system 200 can track whether the generated monitoring packets are received at their respective destination nodes. In one implementation, the network diagnostic module 220 tracks the time after a monitoring packet has been sent to the network. For example, the network diagnostic module 220 may specify a timeout value associated with each monitoring packet. The network diagnostic module 220 stores the time that the monitoring packet was sent into the network, for example, in a storage unit of the network monitoring system 200. If no acknowledgement is received from the destination node for a given monitoring packet after the amount of time indicated by the timeout value has elapsed, the network diagnostic module 220 can determine that the monitoring packet is not received at the destination node. In such a case, the network diagnostic module 220 may flag the path as containing potential faulty link. In some implementations, the network diagnostic module 220 only determines a particular path or link to be faulty if the number of monitoring packets traversing the path or link which fail to reach their destination passes a threshold over a given period of time.

In some implementations, the method 500 determines faults in the network even in situations where monitoring packets successfully reach their destination. For example, the network diagnostic module 220 can monitor whether such packets arrives at their respective destinations intact, without data corruption. In one implementation, each of the monitoring packets includes a checksum, such as a cyclic redundancy check value, which can be used to check if the packet arrived at the destination node intact. The packet generation module 235 computes the checksum when generating the monitoring packet. When the monitoring packet arrives at destination node, the destination node re-computes the checksum based on the contents of the packet and compares recomputed checksum with the checksum in the packet. Non-matching values indicate data packet corruption during transit and may be indicative of a faulty link or node in the network. The destination node may identify detection of such corrupted packets to the network monitoring system 200 along at the same time it verifies receipt of such packet.

In some implementations, the method 500 measures a trip time indicating a time period from a source node sending the monitoring packet to the destination node receiving the monitoring packet. For example, the network diagnostic module 220 can measure the trip time. In one implementation, the monitoring packet may include a timestamp which stores the time that the packet was sent by the network monitoring system 200 into the network. When the destination node receives the packet, the destination node checks the timestamp, calculates the trip time, and sends the trip time back to the network monitoring system 200 along with an acknowledgement message. In another implementation, the network monitoring system 200 stores the time that the monitoring packet was sent onto the network, for example, in a storage unit. When the destination node receives the monitoring packet, the destination node sends an acknowledgement message back to the network monitoring system 200, indicating the time that monitoring packet arrived at the destination node. The network diagnostic module 220 computes the trip time and determines whether the trip time is proper. If the trip time is greater than a threshold, the network diagnostic module may determine the path that the monitoring packet traverse is overly congested.

Figure 6:
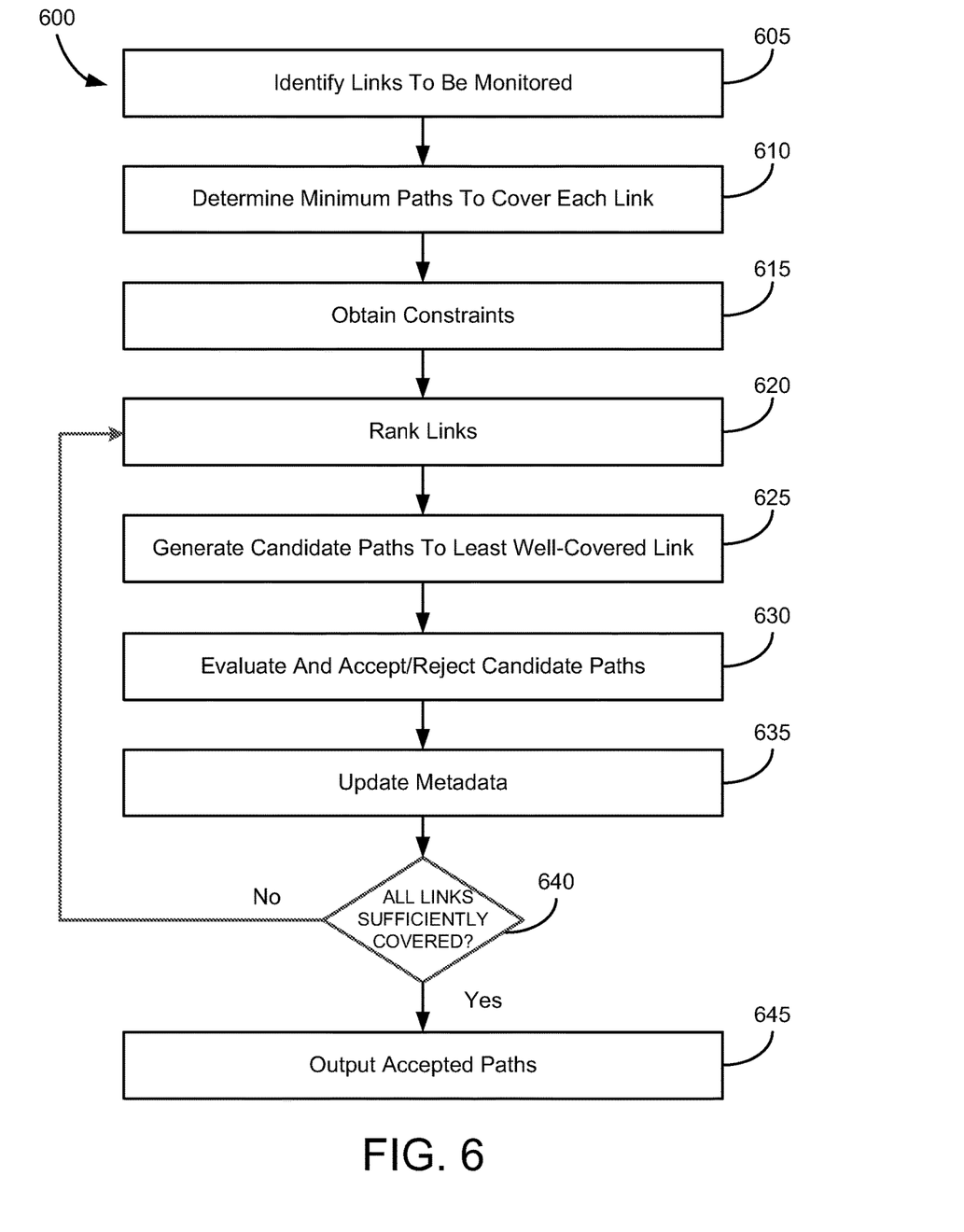
FIG. 6 is a flow diagram of an example method of determining paths in a computer network, according to an illustrative implementation.

In order for the monitoring packets to traverse each link in the monitored network (e.g., networks 300, 400A) and to traverse the links in an efficient and effective way, the network monitoring system 200 generates a set of paths. The set of paths includes each monitored link in the network. In some implementations, the paths are selected such that they yield the maximum information (measured, for example, in terms of Shannon entropy) to decipher what has failed, while still satisfying a set of constraints, such as global network constraints, device constraints, etc. The set of paths allows the network monitoring system 200 to identify faults in the network under realistic failure conditions, including multiple failures. FIG. 6 describes one example method of generating a suitable set of paths.

FIG. 6 is a flow diagram of an example method 600 of determining paths in a computer network for use by the network monitoring system 200. In brief overview, the method 600 includes identifying links to be monitored (stage 605), determining a minimum number of paths to cover each of the respective links (stage 610), and obtaining constraints associated with each of the links and the network as a whole (stage 615). Then, in an iterative process, the method 600 includes ranking each of the identified links based on at least on a number of paths remaining to be assigned to the respective links (stage 620), generating candidate paths for the least well-covered link (stage 625), evaluating the generated candidate paths and accepting or rejecting each of the paths into a set of accepted paths based on the evaluation (stage 630), and updating metadata associated with each link based on which generated paths were accepted (stage 635). This process repeats, beginning with the ranking stage (stage 620), until the set of accepted paths includes paths that cover all of the identified links by the minimum number of links determined in stage 610 (decision block 640) (or it is determined that such coverage is not possible given the constraints obtained at stage 615). Once the set of accepted paths includes a sufficient corpus of paths, the set of accepted paths is output for use (stage 645). In some implementations, the path generation module 225 of the network monitoring system 200 is configured to carry out each of the stages set forth above, either by itself, or in conjunction with one or more of the other modules of the network monitoring system 200.

As indicated above, the method 600 begins with identifying the network links to be monitored in the computer network (stage 605). In some implementations, all of the links in the network are identified for monitoring. In some other implementations, only a subset of the links in the network are identified for monitoring. The set of links to be monitored can be identified, for example, by a network administrator either manually, or by setting criteria for links to monitor. The path generation module 225 can be configured to provide a user interface to the network administrator to accomplish either of these tasks. In implementations in which a set of criteria is provided for identifying links to monitor, the path generation module 225 can be configured to evaluate each of the links in the network with respect to the criteria. Information about each of the links in the network can be obtained from the topology maintenance module 230 of the network monitoring system 200 or the path generation module 225 can retrieve it directly from a data storage unit, such as a database, which is maintained by the network monitoring system 200.

The method 600 then determines a minimum number of paths to cover each of the identified links (stage 610). In order to detect faulty links, each link is included in a minimum number of paths. Different links may need to be covered by a different minimum numbers of paths in order to effectively detect a fault over the link. In one implementation, the factors to determine the minimum number of paths for a given link can include, for example, the fault history of the link, the amount of traffic passing through the link, the available bandwidth of the link, the topology of the network, the cost-effectiveness of including the link in more paths or less paths, etc. The path generation module 225 determines which links are to be included in more paths than other links such that links are not traversed by network monitoring packets with greater redundancy than justified. In one implementation, the determined minimum number of paths for each identified link is stored in metadata associate with that link.

The method 600 also includes obtaining constraints associated with each of the identified links (stage 615). Some constraints may be associated with individual network links, while others may be global network-wide constraints. Such constraints may include caps on the number of monitoring packets that pass through any given node, over any given link, or any combination of nodes and/or links. The constraints may also include protocol constraints. For example some network nodes restrict the use of source routing (similar to the routing process described above with respect to the incorporation a stack of static labels in MPLS packets to route the monitoring packets). Similarly, the path generation module 225 may place a global limit on the number of packets it wishes to send within a given amount of time or the number of source and/or destination nodes it wants to employ. In some other implementations, as discussed below, each link in the network can be assigned a weight indicative of its desirability for inclusion in an additional path. In some such implementations, the obtained constraints can include individual link weight constrains and/or aggregate path weight constraints.

In some implementations, the path generation module 225 can identify the constraints associated with each link on the monitored network, for example, by querying the topology information of the network, sending requests to the nodes to obtain their status, etc. In some other implementations, the path generation module 225 can be pre-configured with one or more of the constraints. In some implementations, the path generation module 225 stores the information in a storage unit, such as a storage unit of the network monitoring system 200 or a separate database independent from the network monitoring system 200.

The method 600 ranks each of the identified network links based at least on a number of paths remaining to be assigned to the respective links (stage 620). In some implementations, the path generation module 225 ranks the links based on the difference between the current number of paths assigned to traverse a link and the minimum number of links associated with the link. Such data can be obtained from metadata associated with the respective links. For example, in some implementations, links with greater difference values (referred to as less well covered links) are ranked higher than links with lower difference values. In some implementations, the difference values correspond to the absolute difference between the number of previously accepted paths including the link and the minimum number determined for the link. In some other implementations, the difference values correspond to the fraction or percentage of the minimum number of paths that has already been accounted for in previously accepted paths, with ties broken, for example, by an absolute difference value. In some other implementations, the ranking is reversed, such that less-well covered links are ranked lower that better-covered links.

After the ranking, the method 600 includes generating candidate paths to a least well-covered link, as indicated by the ranking (stage 625). As indicated above, depending on the implementation, the least well-covered link can be the highest ranked link or lowest ranked link in the rankings assigned in stage 620. In some implementations, the path generation module 225 generates the candidate paths for the least well-covered link randomly.

In some other implementations, the path generation module 225 generates the candidate paths based on weights assigned to each of the links that might be included in a candidate path through the least well-covered link. The weight of a link may be determined based on factors similar to the factors used to determine the coverage of the minimum paths in stage 610. In general, the weight indicates the "cost" of including a link in a path through the least-well covered link. Accordingly, links with low bandwidth availability or which are already included in a larger number of paths in the set of accepted paths are assigned less favorable weights. Links included in fewer accepted paths or with greater bandwidth availability are assigned more favorable weights. In one implementation, the path generation module 225 generates candidate paths starting from multiple source nodes. In some such implementations, the path generation module 225 generates candidate paths starting with the shortest distance paths from the multiple source nodes that pass through the least well-covered link on the way to the destination node.

After generating one or more candidate paths for the least well-covered link, the method 600 includes evaluating and accepting or rejecting each of the candidate paths based at least on the obtained constraints (stage 630). If a candidate path includes one or more links that violates a constraint obtained in stage 615 (for example by exceeding a link weight constraint), the path generation module 225 may reject this candidate path. Whether a candidate path is rejected based on a link's violation of a single constraint or whether multiple constraint violations are necessary for a link to be rejected is implementation dependent. In some implementations, the path generation module 225 scores the candidate paths based on the number of links in the path violating the constraints and the degree of violation. The path generation module 225 rejects paths having scores exceeding a threshold. In some implementations, the path generation module 225 aggregates the weights of the links in a candidate path, and accepts/rejects the path if the aggregate weight exceeds a threshold. In one implementation, the path generation module 225 accepts at least one candidate path having the most favorable aggregate weights.

After one or more paths are accepted, the method 600 includes updating metadata associated with one or more links based on the inclusion of such link(s)s in the newly accepted paths (stage 635). In one implementation, if a link is included in a newly accepted path, the path generation module 225 updates the metadata associated with the link by incrementing a counter indicating the number of paths this link is included in. The path generation module 225 may also update a weight value stored in the metadata associated with the link based on the inclusion of the link in a newly accepted path.

The method 600 then includes determining if all the identified links are sufficiently covered (decision block 640). In one implementation, the path generation module 225 compares the minimum number of paths a link is to be included in and the number of accepted paths that this link is already included in, based on the metadata stored in association with the respective links. If the number of accepted paths meets or exceeds the minimum path value, the path generation module 225 determines this link is sufficiently covered. Otherwise, the path generation module 225 determines this link is not sufficiently covered. In one implementation, the path generation module 225 evaluates all the links identified for monitoring and determines if all the links are sufficiently covered.

In one implementation, if all of the identified links are determined to be sufficiently covered, the method 600 outputs the accepted candidate paths (stage 645). If fewer than all of the identified links are determined to be sufficiently covered, the method 600 returns to stage 620 and performs the functions in stages 620 to 640 iteratively until all the identified links are sufficiently covered, or until it is determined that no new paths can be added without violating one or more constraints.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of any implementations or of what may be claimed, but rather as descriptions of features specific to particular examples. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer implemented method of monitoring a computer network including a plurality of monitored links, comprising:
    specifying, by a network monitoring system, a plurality of links to be monitored in the computer network;
    determining, by the network monitoring system based on the specified plurality of links, respective paths for a plurality of monitoring packets to travel through the computer network to respective destination nodes such that every specified link in the computer network is included in a plurality of paths;
    generating, by the network monitoring system, the plurality of monitoring packets, each monitoring packet including forwarding information identifying each of the specified links the monitoring packet is to traverse along its respective path;
    causing, by the network monitoring system, one or more source nodes to transmit the plurality of monitoring packets such that each monitoring packet commences traversal of its respective path; and
    tracking, by the network monitoring system, receipt of the generated monitoring packets by the respective destination nodes.

2. The method of claim 1, wherein determining the paths comprises:
    determining a minimum number of paths to cover each of the specified links;
    obtaining constraints associated with each of the specified links; and
    iteratively:
        ranking each of the specified links based at least on a number of paths remaining to be assigned to the respective specified link;
        generating candidate paths to a specified link that is covered least well as indicated by the ranking;
        evaluating and accepting or rejecting the respective candidate paths based at least on the obtained constraints; and
        updating metadata associated with at least one specified link based on its inclusion in an accepted candidate path.

3. The method of claim 2, further comprising:
    if all the specified links are sufficiently covered, outputting the accepted paths.

4. The method of claim 1, wherein the destination node of at least one of the monitoring packets includes a node included in the network monitoring system.

5. The method of claim 1, wherein generating the plurality of monitoring packets includes adding the forwarding information to the monitoring packets by one of appending a set of MultiProtocol Label Switching ("MPLS") static labels to the monitoring packet and encapsulating the monitoring packet in a set of nested Generic Routing Encapsulation ("GRE") headers.

6. The method of claim 5, wherein each of the MPLS static labels of the monitoring packets identifies at least an interface of an intermediate node from which the monitoring packet travels to a next node of the intermediate node.

7. The method of claim 1, wherein tracking receipt of the generated monitoring packets comprises:
    determining a packet loss of the generated monitoring packets; and
    measuring a trip time indicating a time period from a source node sending the generated monitoring packets to the destination node receiving the generated monitoring packet.

8. The method of claim 2, wherein every specified link in the computer network is included in at least two paths.

9. A system of monitoring a computer network including a plurality of monitored links, comprising:
    a network monitoring system configured to:

specify a plurality of links to be monitored in the computer network;

determine, based on the specified plurality of links, respective paths for a plurality of monitoring packets to travel through the computer network to respective destination nodes such that every specified link in the computer network is included in a plurality of paths;

generate the plurality of monitoring packets, each monitoring packet including forwarding information identifying each of the specified links the monitoring packet is to traverse along its respective path;

cause one or more source nodes to transmit the plurality of monitoring packets such that each monitoring packet commences traversal of its respective path; and track receipt of the generated packets by the respective destination nodes.

10. The system of claim 9, wherein determining the paths comprises:

determining a minimum number of paths to cover each of the specified links;

obtaining constraints associated with each of the specified links; and iteratively:
ranking each of the specified links based at least on a number of paths remaining to be assigned to the respective specified link;

generating candidate paths to a specified link that is covered least well as indicated by the ranking;

evaluating and accepting or rejecting the respective candidate paths based at least on the obtained constraints; and updating metadata associated with at least one specified link based on its inclusion in an accepted candidate path.

11. The system of claim 10, wherein determining the paths further comprises:

if all the specified links are sufficiently covered, outputting the accepted paths.

12. The system of system 9, wherein the destination node of at least one of the monitoring packets includes a node included in the network monitoring system.

13. The system of claim 9, wherein generating the plurality of monitoring packets comprises adding the forwarding information to the monitoring packets by one of appending a set of MultiProtocol Label Switching ("MPLS") static labels to the packet and encapsulating the packet in a set of nested Generic Routing Encapsulation ("GRE") headers.

14. The system of claim 13, wherein each of the MPLS static labels identifies an interface of an intermediate node.

15. The system of claim 9, wherein tracking receipt of the generated monitoring packets comprises:

determining a packet loss of the generated monitoring packet; and measuring a trip time indicating a time period from a source node sending the generated monitoring packets to the destination node receiving the generated monitoring packet.

16. A non-transient computer readable storage medium storing instructions that when executed by one or more data processors, cause the one or more data processors to perform operations comprising:

specifying a plurality of links to be monitored in a computer network;

determining, based on the specified plurality of links, respective paths for a plurality of monitoring packets to travel through the computer network to respective destination nodes such that every specified link in the computer network is included in a plurality of paths;

generating the plurality of monitoring packets, each monitoring packet including forwarding information identifying each of the specified links the monitoring packet is to traverse along its respective path;

causing one or more source nodes to transmit the plurality of monitoring packets such that each monitoring packet commences traversal of its respective path; and tracking receipt of the generated packets by the respective destination nodes.

17. The non-transient computer readable storage medium of claim 16, wherein determining the paths comprises:

determining a minimum number of paths to cover each of the specified links;

obtaining constraints associated with each of the specified links; and iteratively:
ranking each of the specified links based at least on a number of paths remaining to be assigned to the respective specified link;

generating candidate paths to a specified link that is covered least well as indicated by the ranking;

evaluating and accepting or rejecting the respective candidate paths based at least on the obtained constraints; and updating metadata associated with at least one specified link based on its inclusion in an accepted candidate path.

18. The non-transient computer readable storage medium of claim 16, wherein the destination node of at least one of the monitoring packets includes a node included in the network monitoring system.

19. The non-transient computer readable storage medium of claim 16, wherein generating the plurality of monitoring packets includes adding the forwarding information to the monitoring packets by one of appending a set of MultiProtocol Label Switching ("MPLS") static labels to the monitoring packet and encapsulating the monitoring packet in a set of nested Generic Routing Encapsulation ("GRE") headers.

20. The non-transient computer readable storage medium of claim 16, further comprising instructions that when executed by the one or more data processors, cause the one or more data processors to perform operations comprising:

determining a packet loss of the generated monitoring packet; and measuring a trip time indicating a time period from a source node sending the generated monitoring packets to the destination node receiving the generated monitoring packet.

* * * * *